April 7, 1970   R. A. PHANEUF   3,505,046
UNITING FIBER ENERGY-CONDUCTING STRUCTURES
Filed July 1, 1966   2 Sheets-Sheet 2
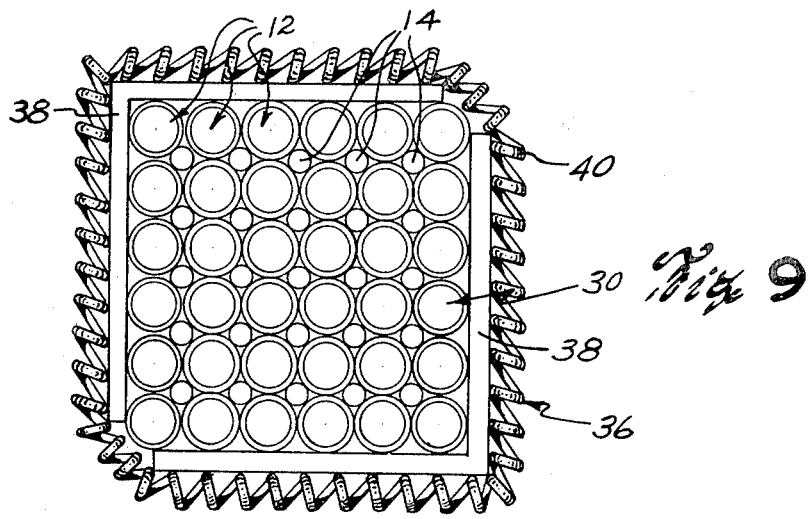
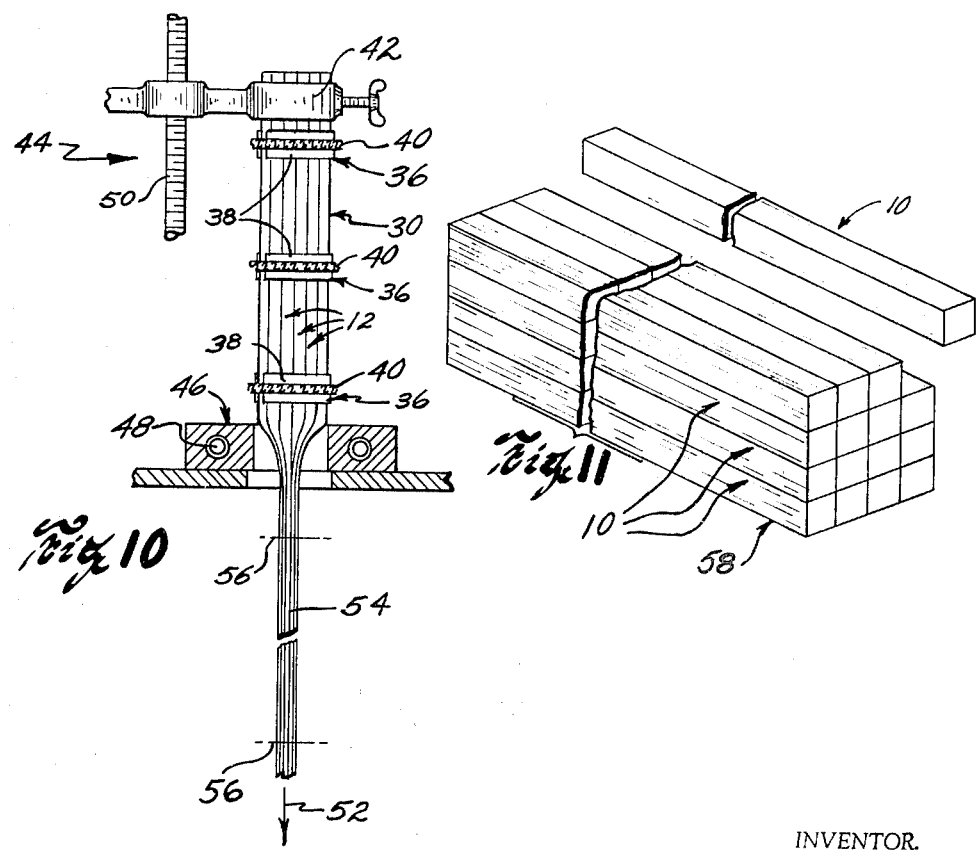
INVENTOR.
ROLAND A. PHANEUF
BY
ATTORNEY

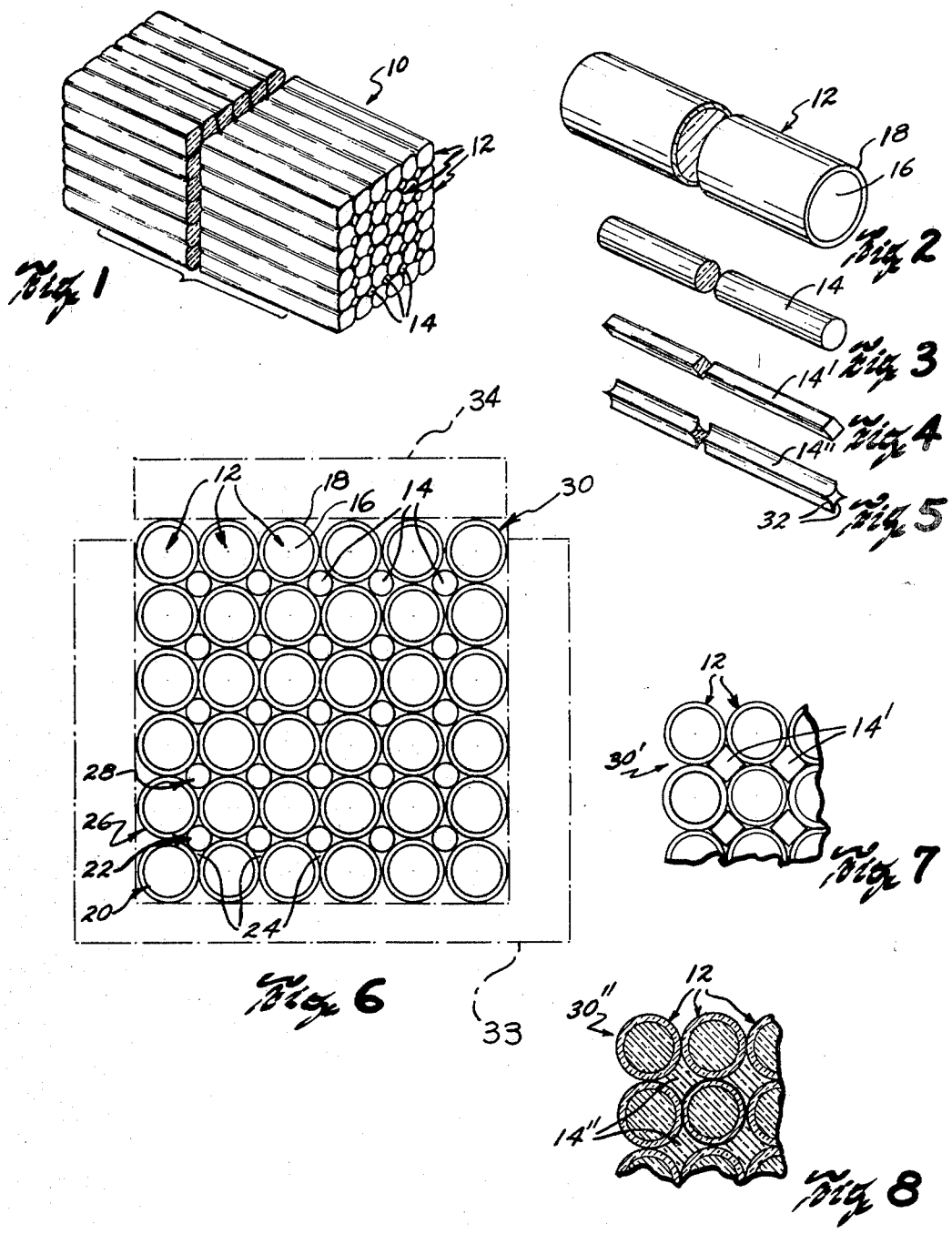

United States Patent Office 3,505,046
Patented Apr. 7, 1970

3,505,046
UNITING FIBER ENERGY-CONDUCTING STRUCTURES
Roland A. Phaneuf, Sturbridge, Mass., assignor, by mesne assignments, to American Optical Corporation, Southbridge, Mass., a corporation of Delaware
Filed July 1, 1966, Ser. No. 565,642
Int. Cl. C03c 25/02, 23/20
U.S. Cl. 65—3                              4 Claims

ABSTRACT OF THE DISCLOSURE

Fused rectangular fiber optical image transmitting devices formed of a multiplicity of round optical fibers of large cross-sectional size and a number of other fibers of smaller cross-sectional size. The large fibers are arranged in a rectangular array with smaller fibers filling interstices therebetween as keys for maintaining alignment of the large fibers and preventing appreciable distortion thereof during fusion of all components of the complex.

---

This invention relates to fiber energy-conducting structures and has particular reference to improvements in fused multifiber devices and methods of making the same.

The expression "multifiber devices" as used herein is intended to include the arrangement of a multiplicity of energy-conducting fibers fused together in side-by-side relationship with each other as a unit whether such unit is threadlike or of greater cross-sectional size and less flexibility even to the point of being of large tranverse dimension and/or rigid. The various uses and principles of operation of such devices either as electrical energy or light transmitters are well known in the field of this invention.

In a multifiber device intended for use as an image transmitter wherein each fiber thereof receives and transmits only a fractional part of a total electrical or light image applied to one end of the entire device, corresponding opposite ends of the individual fibers need to be identically geometrically arranged so that all parts of the image (e.g., a pattern of variably intense electrical or light energy) are emitted in the same relative positions as they are received. Accordingly, when such devices are formed of a plurality of multifibers the ends of all of the fiber components of each multifiber should also be similarly geometrically arranged. Such multifiber devices are sometimes said to be "coherent."

A general object of this invention is to provide for greater ease and effectuality in the manufacture of multifiber energy-conducting devices especially of the aforementioned image-transmitting type.

Another object is to provide a simple, economical and overall highly efficient process for manufacturing coherent multifibers.

A further and more specific object is to provide a novel technique for forming rectangularly shaped multifiber devices of initially round fibers; and Still another object is to accomplish maximal image resolution in such as the latter type devices and to improve the general structure and energy-conducting efficiency thereof.

To attain the aforesaid objects and others which may appear from the following detailed description in accordance with principles of this invention, my multifiber devices are formed of initially relatively large round fibers. These fibers are arranged in both vertically and horizontally aligned side-by-side relationship with each other and are keyed in such relationship by smaller fibers which are placed longitudinally in interstices therebetween. The resulting combination of alternate rows of the larger and smaller fibers is heated to fusing temperature and compressed or drawn longitudinally to form a unitized rectangularly shaped multifiber device. The keys, i.e., smaller fibers, are of a cross-sectional size and shape such as to occupy at least the major portion of the interstitial spacing between the larger fibers so that they not only prevent misalignment of the larger fibers during fusion of the complex but also prevent the larger fibers from becoming excessively misshapen.

As it is well known in the art of fiber optics, round or generally circular fibers are more efficient light transmitters and are easier and generally more economical to manufacture than are fibers of square or other rectilinear configurations when such factors as cross-sectional area, types of glasses used and relative thicknesses of core and cladding are considered. However, in the manufacture of relatively large multifiber devices such as fiberscopes and face plates or the like wherein large numbers of multifibers are required to have at least their opposite ends interconnected in accurately aligned side-by-side relationship, the fabrication of such is facilitated by the provision of square or other rectilinearly shaped elements which become automatically relatively aligned when assembled in side-by-side relationship with each other.

By providing for the manufacture of square or rectangular multifiber devices (e.g., multifibers) which are comprised of essentially round energy-conducting fibers having their corresponding opposite ends accurately geometrically similar, the present invention incorporates the superiority of round fibers as energy conductors with the aforementioned advantages of outward rectangularity of the multifiber structure. As a corollary feature of the use of the smaller keying fibers, they may be made to function individually as energy (e.g., light) conductors or as stray light absorbers which, in either case, enhance the energy-conducting effectiveness of the structure.

The present invention will be more fully understood by reference to the following detailed description which is accompanied by a drawing in which FIG. 1 is an enlarged fragmentary perspective view of an embodiment of the present invention;

FIGS. 2 and 3 are greatly enlarged fragmentary perspective illustrations respectively of an exemplary type of main energy-conducting fiber and a keying fiber, numbers of each of which are employed in the fabrication of multifiber devices according to principles of this invention;

FIGS. 4 and 5 are similar illustrations of modified forms of keying fibers;

FIG. 6 is a greatly enlarged end view of an assembly of fibers of the types illustrated in FIGS. 2 and 3;

FIG. 7 is a greatly enlarged fragmentary end view of an assembly of fibers of the types illustrated in FIGS. 2 and 4;

FIG. 8 is a fragmentary cross-sectional view of an assembly of fibers of the types illustrated in FIGS. 2 and 5;

FIGS. 9 and 10 illustrate exemplary apparatus and procedures used in processing assemblies of fibers according to one aspect of the present invention; and FIG. 11 is a perspective illustration of a partially constructed assembly of finished multifiber devices wherein utility of the subject devices is exemplified.

Referring now to FIG. 1, there is shown fused multifiber device 10 comprised of relatively large, essentially round, energy-conducting fibers 12 and smaller fibers 14 all fused together in axially parallel relationship with each other. Fibers 12 and 14 are prearranged respectively in alternate superimposed parallel rows with the centers of corresponding fibers 12 and 14 of each row thereof accurately aligned so that device 10 has an outer rectangular shape. Device 10 may be threadlike in size and flexibility or of greater cross-sectional size and less flexible.

As shown in more detail in FIGS. 2 and 4, fibers 12 each comprise a core 16 of energy-conducting material (e.g., a metal or glass) surrounded by an insulating cladding 18 of glass. While fibers 14 are illustrated as being unclad, it will become apparent hereinafter that they may be individually clad and thus similar to fibers 12 but of smaller size.

As electrical energy conductors, fibers 12 may have glass clad cores 16 of such metals as stainless steel, aluminum, silver, gold or, for example, a composition such as a gold and germanium alloy of between 4% and 10% germanium content. The latter composition when clad with a glass having a compatible softening temperature and expansion coefficient, e.g., soda lime glass, may be heated and drawn analogously to the recognized practice of heating and drawing glass clad glass fibers.

As light conductors, fibers 12 have cores 16 of relatively high refractive index glass and claddings 18 of a lower refractive index glass. For example, a flint glass having an index of refraction of approximately 1.62 may be used for cores 16 and a soft lime, e.g., soda lime, glass having an index of refraction of approximately 1.52 may be used for claddings 18. Such clad fibers will transmit light by internal reflection in a manner well known and understood in the field of this invention. Suitable core to cladding thickness ratios in either the metal or glass type fibers may be of the order of 10 to 1 respectively. Thicker or thinner claddings may, of course, be used.

Reference in this specification to "light-conducting fibers" shall be deemed to include fibers which perform the analogous function when subjected to electromagnetic wave energy having properties equivalent to those of visible light notwithstanding the fact that such energy is outside the range to which the human eye is sensitive.

Multifiber device 10 is constructed according to principles of the present invention as follows:

A preselected number of round fibers 12 are placed in side-by-side line contact with each other to form a first row 20 thereof (see FIG. 6). A second row 22 of smaller fibers 14 is then nested, one fiber longitudinally in each groove or interstitial space 24 between successive pairs of fibers 12. A third row 26 of fibers 12 is placed over the previously arranged fibers 12 and 14 with each fiber 12 of third row 26 nested longitudinally between successive pairs of fibers 14 in row 22. A fourth row 28 of fibers 14 is then placed upon row 26 of fibers 12 and so on, until assembly 30 is completed.

Fibers 14 are each preselected to be of such cross-sectional size as to fill at least the major portion of the interstitial space between each surrounding quadruplet of fibers 12 and make at least line contact with each fiber 12 threof. Thus, it can be seen that fibers 14 function to key fibers 12 in right angularly aligned horizontal and vertical relationship in assembly 30 thereby giving the assembly an outer rectangular shape. In view of their function as keys, fibers 14, 14' and 14" (FIGS. 3, 4 and 5 respectively) will be referred to hereinafter as "keying fibers."

Keying fibers 14' (FIG. 4) of square cross-sectional shape may be substituted for the aforementioned round fibers 14 if it is desired to fill a greater amount of the interstitial spacing between fibers 12 in an assembly such as 30' (FIG. 7). Alternatively, fibers such as 14" (FIG. 5) having cylindrically concave sides 32 of a curvature matching that of the outer sides of fibers 12 may be substituted for either of fibers 14 or 14' when it is desired to completely fill the interstitial spacing between fibers 12 in an assembly such as 30" (FIG. 8); and it should be appreciated that a cross-sectional view of such an assembly after being fused to form a multifiber will have substantially the same cross-sectional appearance.

It will become more apparent hereinafter that, with the latter type construction, no lateral distortion of fibers 12 other than those outermost in assembly 30" is permitted to take place during subsequent processing thereof. In the case of the former arrangements of assemblies 30' and 30, fibers 12 and 14' or 14 respectively may become slightly laterally distorted during subsequent compression and/or drawing thereof but only to the negligible extent of the fibers being caused to assume such relative shapes as to close minute voids therebetween.

Lateral compression of any one of assemblies 30, 30' and 30" under high temperatures, may tend to produce a slight flattening of exposed outer sides of the outermost fibers 12 thereof. In all cases, however, these and all of the other fibers 12 retain essentially their round or circular cross-sectional shape.

In forming assemblies 30, 30' or 30" a U-shaped support 33 (shown by dot-dash outline in FIG. 6) may be employed to facilitate establishment of the aforementioned right angularly aligned relationship of the energy-conducting and keying fibers.

Assembly 30 and support 33 may, as a unit, be placed in a conventional glass fusing furnace or oven capable of heating fibers 12 and 14 to their fusing temperature if it is desired to fuse the fiber complex without drawing. A weight 34 (shown by dot-dash outline in FIG. 6) may be placed upon assembly 30 if it is desired to compress fibers 12 and 14 into tightly fused relationship with each other.

In another mode of processing the aforementioned assemblies, they are bound circumferentially at spaced points along their respective lengths and fused and drawn to a reduced cross-sectional size in a single operation such as that illustrated in FIGS 9 and 10.

In FIGS. 9 and 10, assembly 30 is bound with a number of spaced clamps 36. Each clamp comprises a pair of thin angle irons 38 placed one diagonally opposite the other against the assembly and compressively held thereinplace by a coiled spring band 40. Other forms of removable bindings such as asbestos tapes, ties or elastic bands which are capable of withstanding high temperatures may be substituted for clamps 36.

One end of the bound assembly 30 is clamped in fixture 42 of fusing and drawing apparatus 44. Fixture 42 supports the assembly in vertically aligned relationship with stationary heating ring 46. Ring 46 which may comprise either an electrically operated heating element 48 or gas burner (not shown) is adapted to heat the materials of assembly 30 to a suitable fusing and drawing temperature progressively along its length as assembly 30 is lowered axially therethrough. This is often referred to in the art as "zone" heating. Assembly 30 is gradually lowered longitudinally through heating ring 46 by rotatable drive screw 50 which, in recognized fashion, is threaded through fixture 42. Upon becoming zone heated to a suitable fusing and drawing temperature, the depending end of assembly 30 is "baited" and drawn in the direction of arrow 52 at a uniform rate greater than that of the lowering thereof so as to simultaneously fuse all fibers 12 and 14 tightly together and effect a desired reduction in overall size of the assembly. At or just prior to reaching heating ring 46, the lowermost clamp 36 on assembly 30 may be removed therefrom or not, as desired. If not removed and thus permitted to engage ring 46, continued lowering of assembly 30 will slide the assembly through it. Each clamp 36 will ultimately engage its predecessor whereupon they may all the removed at the same time to permit lowering of assembly still further to the point where fixture 42 contacts ring 46.

A square assembly 30 having six fibers 12 on a side each approximately .120 inch in diameter and formed of the aforementioned exemplary flint and soda lime glasses with keying fibers 14 each of approximately .045 inch in diameter and formed of a similar flint glass may, for example, be drawn to a reduced overall cross-sectional size of .250 inch square at a ratio of draw-to-lowering of the assembly of approximately 8:3 when the assembly is heated to approximately 750° C. It will, of course, be immediately recognized by those skilled in the art that wide variations of the foregoing exemplary numbers of fibers, their sizes, drawing ratio and temperature may be used and that, within practical limitations, any desired greater or lesser reduction in the size of assemblies such as 30, 30' or 30" may be readily effected. Furthermore, once an assembly such as 30, 30' or 30" is drawn, it or a section such as 54 taken from between lines 56 (FIG. 10) may be redrawn one or more times to reduce its size still further either alone or in an assembly of a number of grouped parallel sections.

Such a drawn or redrawn section 54 thus constitutes multifiber device 10.

A number of multifiber devices 10 being of square or rectangular cross-sectional configuration may then be assembled in aligned side-by-side relationship with each other as mentioned hereinabove so as to form a large multifiber structure 58 (see FIG. 11) wherein corresponding opposite ends of the individual fiber elements are identically geometrically coherent. It should be understood that devices 10 in structure 58 may each be individually fiberlike (i.e., long, thin and flexible) and fused, cemented or otherwise connected together only adjacent their corresponding opposite ends. Alternatively they may be relatively large in cross-sectional size and/or rigid and connected together along their entire lengths. The former arrangement will be recognized as a type of structure known in the art as a flexible fiberscope while the latter type structure may, for example, be used as a rigid image transmitter or cut transversely into relatively thin sections to form image-transmitting plates.

A corollary feature of keying fibers 14, 14' or 14" being of substantially the same refractive index as cores 16 of fibers 12 or at least of higher refractive index than claddings 18 is that light reflecting interfaces are formed by claddings 18 along the sides of the keying fibers thus making them contributory internally reflective light conductors in each multifiber devices 10.

Keying fibers 14, 14' or 14" may, alternatively, be formed of a light-absorbing metallic or glass material and, as such, absorb stray light tending to traverse the multifiber device 10 from one fiber 12 toward another. The term "stray light" is recognized in the fiber optics art as meaning rays of light which, in entering a clad fiber, strike its core and cladding interface at an angle smaller than the crtiical angle of reflection. Thus, instead of being internally reflected, such rays propagate through the cladding laterally toward and into adjacent fibers with the adverse affect of ultimately diluting internally reflected image-forming light.

According to another aspect of this invention, fibers 14, 14' or 14" may be formed of a metallic composition such as the aforementioned gold-germanium alloy which has a softening temperature and expansion coefficient compatible with that of claddings 18. In such case, the keying fibers will be individually electrically conductive and contribute to the overall electrical conductivity of a device 10 formed of fibers 12 having electrically conductive cores 16. Combinations of light and electrically conductive fibers 12 and 14 respectively or vice versa may also be used.

The keying fibers 14, 14', 14" whether formed of glass or metal may be individually glass clad whenever cladd- dings 18 of fibers 12 are deemed to be of insufficient thickness for the purpose of suitably individually insulating fibers 14, 14' or 14" from fibers 12.

I claim:

1. The method of making a fused rectangular energy-conducting device of a plurality of round optical fibers of large cross-sectional size and a number of other fibers of relatively small cross-sectional size with preservation of the cross-sectional configuration of at least the majority of the large fibers, said method comprising the step of:

arranging said large fibers in accurately aligned superimposed rows wherein the fibers in each row are in side-by-side single line contact with each other and are also in single line contact with correspondingly superimposed fibers of the successive rows thereof, said lines of contact and the centers of said correspondingly superimposed fibers of said successive rows being, in each case, all accurately aligned in a plane disposed perpendicularly to the planes of lines of contact and centers of the fibers in respective rows thereof, there being interstices between said large fibers;

placing said small fibers one in each of said interstices during said step of arranging said large fibers, each of said small fibers being of such preselected size and shape as to make at least line contact with each of all large fibers surrounding same in the resulting complex of said large and small fibers whereby said small fibers key said large fibers against displacement; and heating the complex to a temperature sufficient to fuse all of said relatively large and small fibers together as an integral rectangular unit wherein said large fibers retain essentially their initial round configuration.

2. The method as recited in claim 1 wherein said relatively large and smaller fibers of said complex are held in said aligned relationship, zone heated to said fusing temperature progressively from one end toward the other thereof and drawn as a unit longitudinally to a reduced cross-sectional size.

3. The method as recited in claim 1 wherein said fiber complex is heated to said fusing temperature substantially uniformly through its length to effect said fusion of said relatively large and smaller fibers thereof.

4. The method as recited in claim 1 wherein said smaller fibers are preselected to be of a size and shape substantially corresponding to that of each of said interstices within which they are positioned as keys.

References Cited

UNITED STATES PATENTS

| | | | |
|---|---|---|---|
| 2,608,722 | 9/1952 | Stuetzer | 65—4 XR |
| 3,196,738 | 7/1965 | Hick. | |
| 3,278,283 | 10/1966 | Bazihet | 65—4 |
| 3,279,903 | 10/1966 | Siegmund | 65—4 |
| 3,323,886 | 6/1967 | Hays | 65—4 |
| 3,387,959 | 6/1968 | Cole | 65—4 |

FRANK W. MIGA, Primary Examiner

U.S. Cl. X.R.

65—4, 65—38, 65—43; 350—96